United States Patent [19]

Bartunek et al.

[11] 4,325,106
[45] Apr. 13, 1982

[54] ONE PIECE BATTERY HOLDER

[75] Inventors: William Bartunek, Yonkers; Gordon E. Kaye, Garrison, both of N.Y.; Henry R. Mallory, Greenwich, Conn.

[73] Assignee: Duracell International Inc., Bethel, Conn.

[21] Appl. No.: 74,219

[22] Filed: Sep. 10, 1979

[51] Int. Cl.³ .............................................. F21L 7/00
[52] U.S. Cl. .................................. 362/157; 362/200; 362/205; 362/217; 362/221
[58] Field of Search ............... 362/200, 157, 205, 217, 362/221

[56] References Cited

U.S. PATENT DOCUMENTS 4,074,122  2/1978  Moore .................................. 362/208
4,079,243  3/1978  Pemberton ........................... 362/208

Primary Examiner—Stephen J. Lechert, Jr.
Attorney, Agent, or Firm—Ronald S. Cornell; Israel Nissenbaum; Martin M. Glazer

[57] ABSTRACT

A battery holder comprising a drawer having a plurality of compartments, each sized to accommodate a single battery, each compartment being polarized so that a battery can be placed therein only in a predetermined position, means for electrically interconnecting the batteries, and means for connecting a user circuit to the battery holder. The battery holder can further comprise means for retaining the battery within the compartment and a circuit switch to protect the user circuit from circuit runaway.

12 Claims, 3 Drawing Figures

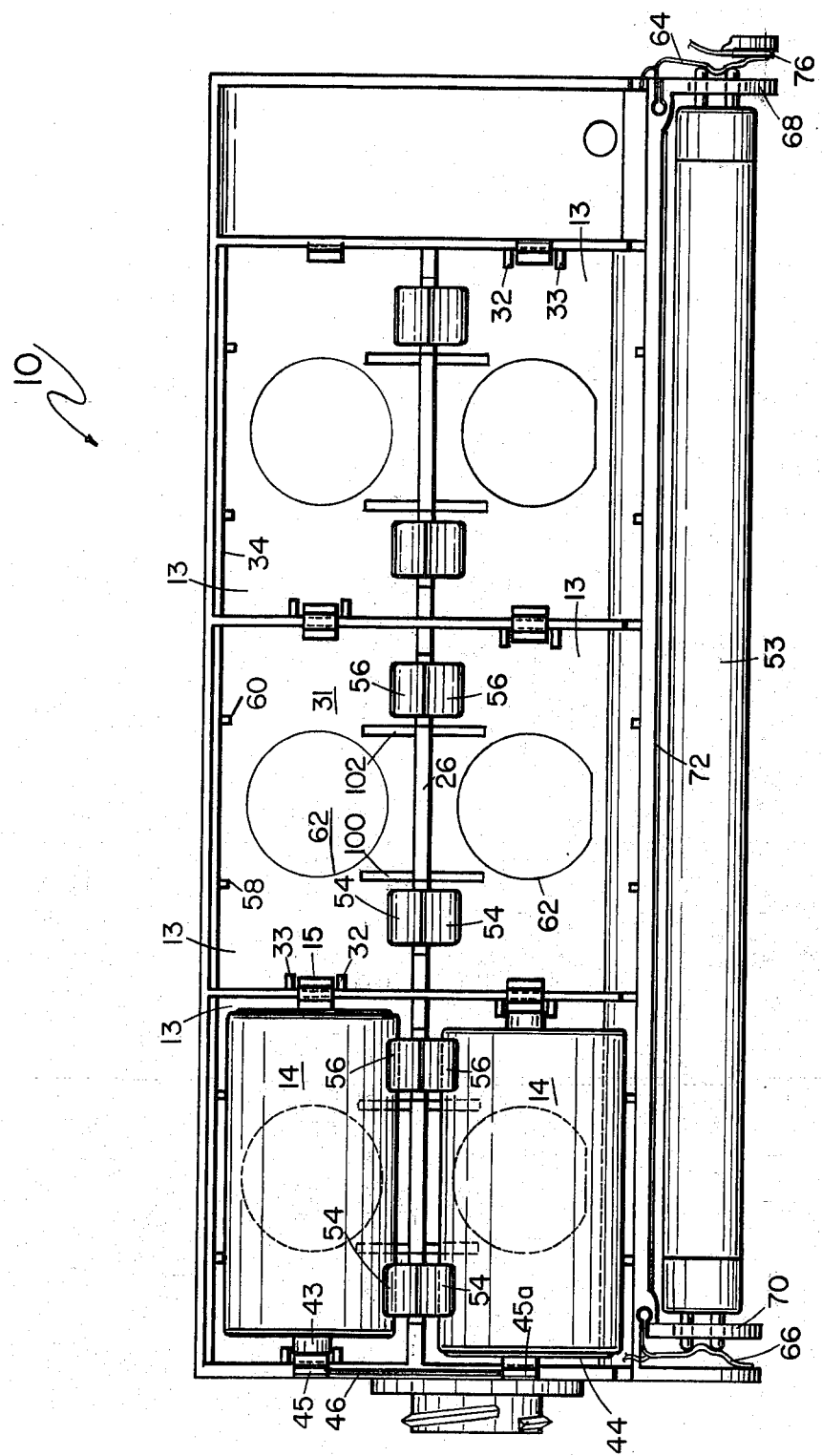

ONE PIECE BATTERY HOLDER

Reference is made to application Ser. No. 17,216 filed on Mar. 5, 1979 wherein there is disclosed a portable waterproof fluorescent lantern which utilizes a one piece battery holder such as that disclosed herein.

FIELD OF THE INVENTION

The invention is related to a one piece battery holder and more particularly to a holder used in battery powered devices such as portable fluorescent lanterns.

BACKGROUND OF THE INVENTION

With the proliferation of portable battery powered devices, a need has arisen for a better and more easily constructed battery holder. This need has been heightened by the development of devices requiring multiple batteries since these multiple batteries increase the problems associated with previously known battery holders.

A useful battery holder should perform several functions in order to ensure the continued proper and safe operation of the battery powered device. The battery holder should keep the batteries in proper alignment and in uninterrupted electrical contact with each other. This can be accomplished by the use of battery interconnectors which electrically connect the batteries so that the device can draw power from all of the batteries simultaneously. Poor battery contact with the battery interconnectors causes high resistance which results in a reduction in the voltage reaching the battery powered device. Lowered voltage results in poor device performance, especially in voltage sensitive devices such as fluorescent lanterns. Poor or intermittent battery contact can also result in intermittent device operation which is objectionable to the device user.

Poor or intermittent battery contact with the battery interconnectors is usually a result of battery movement or dislodgement caused by vibration and shock. The vibration and shock cause the battery terminals to move away from ideal electrical contact with the battery interconnectors. Vibration and shock are commonly associated with portable battery powered devices, since these devices are primarily used outside of the relatively safe environment of the home or office.

The rugged use to which portable battery powered devices are subject, requires the battery holder to withstand strong shocks and impacts. The holder must withstand these shocks without battery breakthrough, a situation where, on impact, the battery breaks through the battery holder, damaging the device it is powering. This problem is accentuated by the high density of alkaline type batteries which are preferred for use in portable devices, and by the large number of such batteries required by many devices.

Many previously known battery holders were not polarized, but depended on printed warnings and instructions to maintain proper battery polarity. Improper battery polarity can damage the battery and also the portable device. Improper placement of one of several batteries into a battery holder will result in reversing the flow of electricity through the battery. This may cause that battery to leak or rupture, damaging the battery powered device. The reduced voltage resulting from the improper polarity of a battery will result in the reduced or unsatisfactory operation of the battery powered device. Complete reversal of the battery polarity, as when all the batteries are improperly inserted, may result in damage to the battery powered device.

Interrelated with sensitivity to shock and vibration, and means to insure proper battery polarity within the holder, is the ease with which batteries are inserted and removed by the user of the battery holder. Attempts to decrease battery holder sensitivity to shock and vibration, and attempts to insure proper battery polarity within the holder have in the past resulted in an increase in the difficulty associated with the insertion and removal of the batteries. Coupled with this increased difficulty in battery removal is usually an increase in damage to the battery holder caused by improper battery insertion and removal.

Many problems associated with the assembly of other manufactured articles are also encountered in the assembly of previously known battery holders. Such problems include high labor costs due to the large number of steps involved in the assembly of previous battery holders. Poor quality of the finished holder results from the large number of manual steps and individual items involved in the manufacture of previous holders. Low reliability of the finished holder in actual use is due to the large number of components used in the holder, where a failure in one component usually leads to a failure of the entire holder.

THE INVENTION

A battery holder has now been invented that can withstand shock and vibration without structural failure or battery dislodgement. The new battery holder is manufactured as a one-piece molded plastic unit with a limited number of manual operations being necessary to incorporate a minimum number of associated components. The holder incorporates integral means for insuring the correct polarity of the batteries within the holder. Also incorporated as part of the holder is means for retaining the battery within the holder, which means does not unduly restrict the insertion or removal of the batteries. The holder contains a provision for the placement of a user circuit, such as an inverter ballast circuit, within the holder.

The novel battery holder comprises a drawer having a plurality of individual battery compartments. Each battery is supported by a combination of five walls and means for retaining a battery within each compartment. This holder design permits the battery to be supported on all sides at all times and is different from the battery compartments used in previous battery holders where three or more batteries were supported by a single wall. Since the present design provides multiple walls for each battery, it is less likely that a battery will be dislodged from or break its supporting structure as the result of a hard jolt or shock.

Compartmentalization of the battery holder permits each compartment to be polarized and provides a secure support for the means for electrically interconnecting the batteries. The interconnecting means in the preferred embodiment is manufactured from a spring metal which provides increased stability of the battery within each compartment by biasing the battery against the opposing wall.

In the preferred embodiment the walls facing the positive terminals of the batteries contain two protrusions so spaced that only the positive battery terminal can pass between the protrusions to make contact with the battery interconnecting means, which means is held in place between the protrusions. Thus, if a battery is improperly forced into the compartment, no electrical connection can be made by the negative terminal and no damage to the portable device or battery will occur.

The compartment walls further provide a positive anchor for the battery interconnecting means. The end walls of predetermined compartments contain an aperture which permits specially designed ends of the interconnecting means to interlace through the wall and be rigidly anchored to the wall. The end walls of the other compartments supply anchorage for the means for connecting a user circuit to the battery holder, so that current can be directed from the battery holder to the portable device.

The battery holder of the present invention is molded in one operation, with the use of a single mold. The molded holder provides for the easy insertion of the simple interconnecting means and user circuit connecting means. The holder described and claimed herein is therefore much cheaper to make than previously known battery holders, which required sequential steps and multiple components. The reduction in manufacturing steps further decreases the chances of producing a defective holder due to the reduction of human error. The elimination of most of the individual components of the holder also reduces the chances of holder failure while in use, since there are less components to fail.

The present invention can be molded of any non-conducting material capable of being used in molding operations. Preferably the material used is impact resistant. Examples of such materials include ABS (acrylonitrile, butadiene and styrene copolymers), nylon, high impact polystyrene and polycarbonate. The preferred material is ABS due to its impact resistance, its molding properties and its low cost.

These and other advantages of the invention will be apparent from the following discussion as well as from the drawings.

BRIEF DESCRIPTION OF THE DRAWINGS

FIG. 3 is a top plan view of the battery holder.

DETAILED DESCRIPTION OF THE DRAWINGS

Figure 1:
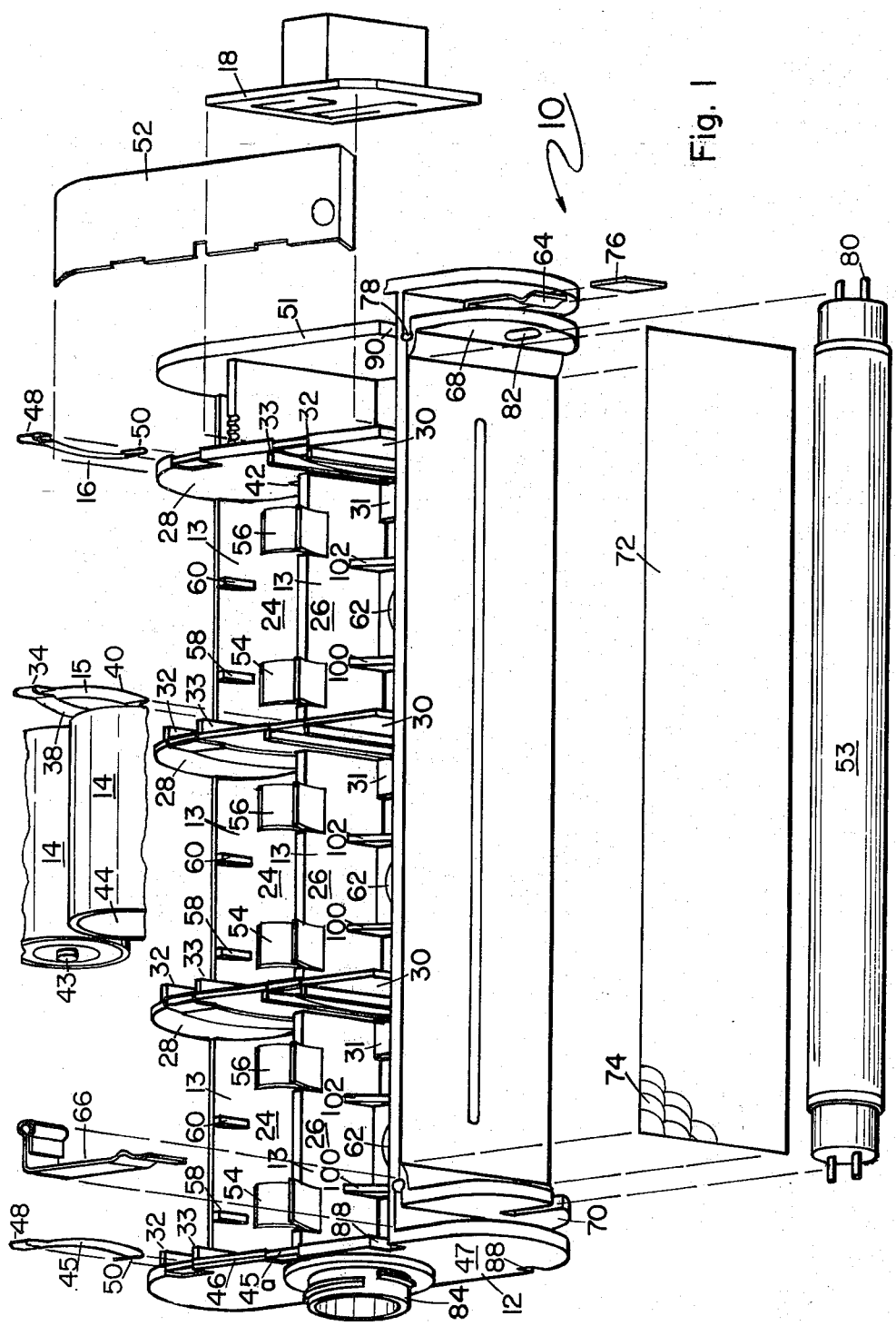
FIG. 1 is an exploded isometric view of the battery holder.

The battery holder 10 shown in FIG. 1 is comprised of a drawer 12 having six compartments 13 with each compartment 13 so sized to accommodate a single battery 14; means 15 for electrically interconnecting the batteries; and means 16 for connecting a user circuit, here a ballast inverter circuit 18, to the holder 10. Each compartment 13 has two side walls 24, 26, two end walls 28, 30 and a bottom wall 31. Each compartment 13 is also polarized, so that a battery 14 can be placed therein only in a predetermined position.

Figure 2:
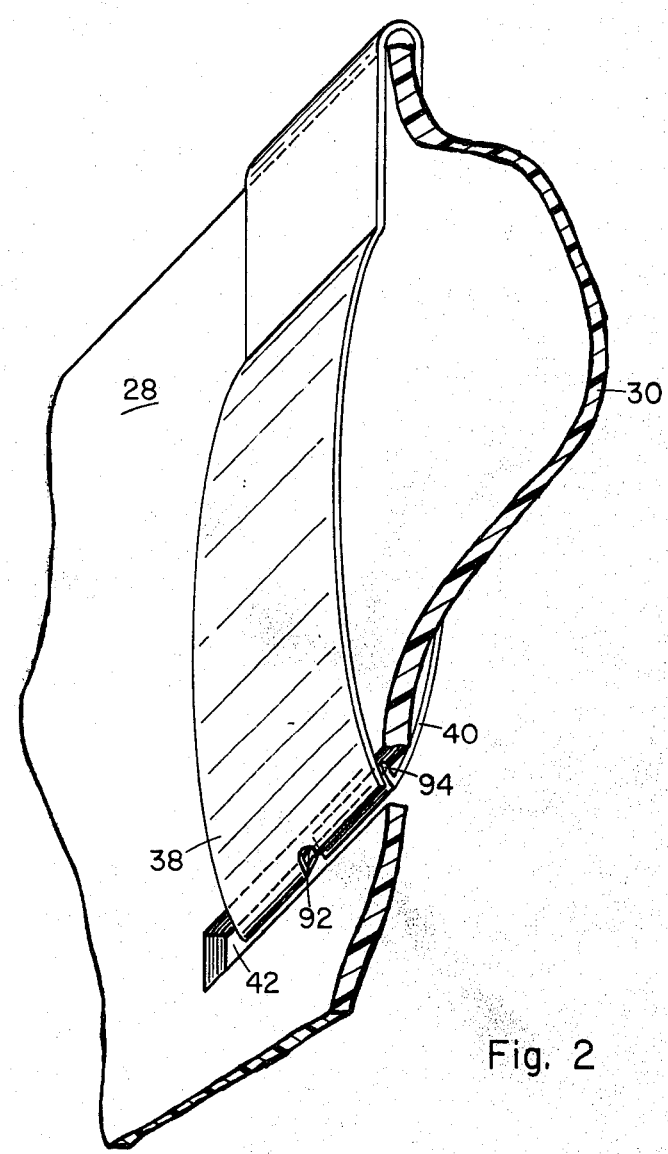
FIG. 2 is an enlarged isometric view of the ends of the arms of the means for interconnecting the batteries.

The means 15 for electrically interconnecting the batteries fits between two substantially linear vertical flanges 32, 33 centrally located on end walls 28, 30. A preferred embodiment of means 15 comprises an oval shaped strip of a spring metal, such as nickel plated steel, having a "U" shaped closed end 34 which engages the top edge of end walls 28, 30. The spring metal is not limited to nickel plated steel, other spring metals known in the art can also be used. The other end of the oval strip is open, forming two arms 38 and 40. The ends of the arms 38, 40 are turned inward toward the "U" shaped end 34. The inturned ends of the arms 38, 40 have tabs 92, 94 which are shown enlarged in FIG. 2 and complementary cutout portions. When the means 15 is inserted between the flanges 32, 33 the tabs 92, 94 grasp the bottom edge of the end walls 28 and 30 after they pass through an aperture 42 therein. The means 15 in this way is firmly held on the walls 28 and 30, with one arm (38, 40) against each surface of the wall.

When a battery 14 is in place within a compartment 13, the spring tension of the means 15 against the battery terminals 43, 44 insures good electrical contact with the battery. Further, the spring tension helps to hold the battery in place within the compartment 13 and helps to cushion the end walls 28, 38 from any stress exerted on them by the battery 14 when the holder 10 is subject to shock.

The two substantially parallel, linear flanges 32, 33 in addition to helping hold the means 15 in position also function to polarize the compartment 13. The protrusions 32, 33 face the predetermined position for the positive battery terminal 43 and are separated by a distance substantially similar to, but not smaller than the diameter of the positive terminal 43 of the battery 14. The narrow space between the protrusions 32, 33 prevents the much wider, substantially flat, negative battery terminal 44 from making unwanted contact with the interconnecting means 15 or other connecting means which may be in place there.

Flanges 32, 33 further function to properly align the positive battery terminal 43 with interconnecting means 15 and help to prevent lateral movements of the positive terminal 43 if the battery holder 10 is subjected to shock and vibration. Movement of the battery terminal 43 can interrupt the flow of current from the battery 14. The lateral support provided to the interconnecting means 15 by the flanges 32, 33 also helps to prevent lateral movement and dislodgement of the means 15 from the walls 28, 30 and further assures continuing contact of the means 15 and the positive terminal 43.

The flanges 32, 33, which preferably extend the length of the wall 30, act to reinforce and strengthen the walls 28, 30. The strengthened walls 28, 30 are then better able to absorb any stress applied to them when the holder is shocked, as by being dropped.

Two other connecting means are used in the preferred embodiment shown. One is the means 16 for connecting a user circuit to the holder, which is located, in a preferred embodiment, on the compartment 13 closest to the user circuit 18. The second means is a pair of end clips 45 and 45a interconnected by a wire 46. The end clips 45, 45a and conductive means 46 interconnect the two rows of compartments 13, shown in FIG. 1, in series. In other embodiments the end clips 45, 45a can electrically connect the rows in parallel. Further, they can connect as many rows of compartments 13 in either parallel or series as desired. The end clips 45, 45a are identical in appearance to the means 16 for connecting a user circuit to the battery holder and both can be made of the same spring metal as the means 15 for electrically interconnecting the batteries.

In the preferred embodiment shown, the end clips 45, 45a and wire 46 are located on the far end wall 47 of the drawer 12. One end clip 45 is shown between protrusions 32 and 33 in order to make contact with the positive terminal 43 of the battery 24. The other end clip 45a makes contact with the negative terminal 44 of a second battery and, in combination with wire 46 and end clip 45, connects the two rows of compartments 13 in series.

Connecting the six compartments 13 shown in series results in nine volts being supplied to the circuit 18 when 1.5 volt batteries are used in each compartment 13. By increasing or decreasing the number of compartments 13 or connecting them in parallel, the voltage supplied to the circuit 18 or other user of electrical energy (not shown) can be easily varied. This feature permits the battery holder 10 of the invention to be used with many electrically powered devices.

In a preferred embodiment the connecting means 16 for connecting a user circuit to the battery holder and the end clips 45, 45a are identical. Advantageously, each will comprise an elongated strip of spring metal with a "U" shaped bend 48 at one end of the strip. The bend 48 engages the upper edge of the walls 28 and 30. The other end 50 of the strip is reverse folded back toward the "U" shaped bend 48. The inwardly turned end 50 passes through an aperture 42 in the wall to which it is to be attached and grasps the wall firmly whereby the means 16 or end clip 45, 45a is held firmly against the wall. Any suitable conductive means (not shown) can be used to electrically connect the inverter-ballast circuit 18 to the means 16.

The inverter-ballast circuit 18 can be positioned in a cubicle 51 in the battery holder 10, potted with a potting compound (not shown) and covered by a protective plate 52. This combination of protective elements prevents the circuit 18 from being affected by dust and moisture present in the environment, and cushions the circuit 18 against any mechanical shocks applied to the appliance. Other circuits (not shown) which can be used with the battery holder 10 of the present invention can also be placed in the cubicle 51 which can be of any desired size. Items which can be powered by the present invention include radios, cameras, photoflash equipment, microcomputers, etc.

The battery holder 10 of the present invention may desirably further comprise means to inhibit movement of the battery within the compartment. Such means, a preferred embodiment of which is shown in FIG. 1, securely holds the battery 14 within the compartment 13 and thereby reduces the likelihood of a poor or disrupted contact between a battery 14 and its battery interconnecting means 15. A reliable supply of power to the user circuit 18 prevents the emission of intermittent or low light from the lamp 53, which in this embodiment is powered by the user circuit 18.

The means for retaining the battery comprises a pair of resilient fingers 54, 56 projecting from planar side wall 26, and a pair of projections 58, 60 located on curved side wall 24, and a pair of second projections 100, 102 (shown in FIG. 3) that span side wall 26 and bottom wall 31. The two pairs of projections 58, 60 and 100, 102, along with the fingers 54, 56 hold the battery 14 in a pair of three-point support systems and substantially prevent the battery 14 from moving with respect to the battery compartment 13. The resilient fingers 54, 56 are molded as an integral part of the side wall 26.

The second projections 100, 102 also act to tie the side walls 26 and bottom wall 31 together. This in turn strengthens both walls 26 and 31 and acts to attenuate any stress applied to the walls by the battery 14, by distributing it to the other components of the compartment 13. The distribution of stress prevents a concentration of stress on any one wall, which can cause the wall to fail.

Within the bottom wall 31 of each compartment 13 there is located means for entry of an object into the compartment to dislodge the battery. In the preferred embodiment of the present invention the means is a hole 62 in the bottom wall 31 through which a finger or other object (not shown) can be inserted to dislodge the battery 14. Such means to dislodge the battery 14 is necessary because of the efficiency of the means for retaining the battery within the compartment which greatly impedes dislodgement of the batteries from the compartments 13.

As stated hereinabove, in its preferred embodiment the invention is intended for use in a fluorescent lantern. Accordingly, in this embodiment a fluorescent lamp 53 is electrically connected to the circuit and held in place in the holder 10 by two lamp contact springs 64, 66. The springs 64, 66 are located in flanges 68, 70 respectively, which project from the battery holder 10.

A portion of the light produced by the lamp 53 is reflected away from the holder 10 by a reflector 72 mounted on the side of the holder 10. The reflector 72 has a textured surface comprising a multiplicity of semicircles 74 embossed on a reflective layer and covered by a clear layer.

One of the lamp contact springs 64 forms part of a circuit switch associated with the first flange 68. The switch which electrically connects the batteries 14 and the circuit 18 is comprised on the lamp contact spring 64 and a switch contact 76 (FIGS. 1 and 3). The contact spring 64 is held in place in a recess 78 (FIG. 1) in flange 68 and is electrically connected to the inverter-ballast circuit 18. The switch contact 76 rests on a part of the portable lantern or another surface provided for this purpose (not shown) and is electrically connected to the means 16 for connecting a user circuit.

When a terminal 80 of the lamp 53 is inserted into the aperture 82 of the flange 68 during the insertion of the lamp 53 into the battery holder 10, the spring contact 64 is forced against the switch contact 76 closing the electric circuit between the inverter-ballast circuit 18 and the means 16 for connecting a user circuit. The inverter-ballast circuit 18 is thus only connected to a source of electrical power, here the batteries 14, when the lamp 53 is in place on the battery holder 10. The switch prevents the inverter-ballast circuit 18 from being activated when the lamp 53 is not electrically connected thereto. If the inverter-ballast circuit 18 were to be connected to a source of electricity while the lamp 53 was not connected to the circuit 18 and the circuit switch was not in place, circuit runaway could occur, causing the circuit 18 to overheat and self destruct.

In a preferred embodiment of the invention, a threaded member 84 is provided integral with the end wall 47. Member 84 mates with a second threaded portion (not shown) of a device, such as the portable waterproof fluorescent lantern disclosed in application Ser. No. 17,216 filed on Mar. 5, 1979. The mating of the threaded portions locks the holder 10 to the device. Unlocking the threaded portions permits the user to remove the battery holder 10 so that the batteries 14 or lamp 53 can easily be changed.

The preferred embodiment of the present invention, which is to be used with a fluorescent lantern, also includes a pair of guide slots 88, 90 located on the battery holder 10. The guides 88, 90 are adapted to engage a rail (not shown) positioned on the inner surface of the fluorescent lantern housing. The guides 88, 90 function to properly align the battery holder with the device using it.

In FIG. 3 the assembled battery holder 10 is shown with the lamp 53 and two batteries 14 in place. The top plan view clearly shows the means for retaining the battery within the compartment. The means shown is comprised of a pair of resilient fingers 54, 56 a pair of projections 58, 60 and a pair of second projections 100, 102 that span the second side wall 26 and bottom wall 31. The battery 14 is held in place in the compartment 13 by the pressure of the fingers 54, 56 on the battery 14 holding it against the projections 58, 60 and 100, 102. Other retaining means can also be used with the holder 10 of the present invention. These alternative means include multiple fingers (not shown) curving walls (not shown) and others well known in the art.

The positive terminal 43 of one battery 14 is shown in place in FIG. 3 between the protrusions 32 and 33 and in contact with the end clip 45. Similarly, the positive terminal 43 of the second battery is shown in contact with the interconnecting means 15.

The negative terminal 44 of the second battery is also shown connected to a second end clip 45a. The two end clips 45 and 45a are shown connected by wire 46 thus connecting the two batteries in series.

A lamp 53 is shown in place between flanges 68 and 70 and is held in place by the opposing lamp contact springs 64 and 66. With the lamp 53 in place the first contact spring 64 is pressed against the switch contact 76 closing the circuit switch. The reflector 72 is shown in place on the holder 10, behind the lamp 53.

The preceding description of a specific embodiment of the invention was for illustrative purposes only. The battery holder of the present invention is not for use only with the lamp 53, but can also power other devices using electricity. Similarly the battery holder of the present invention is not limited to the number of compartments shown nor their spatial relation to each other. The compartments can be sized to accept any sized cell or battery by simply altering the sizes of the various compartments walls. Other changes and variations can also be made without department from the spirit and scope of the present invention as defined in the following claims.

We claim:

1. A battery holder comprising a drawer having a plurality of abutting compartments, each compartment being separated from the others by walls which isolate each compartment from each next adjacent compartment, and each compartment being sized to accommodate a single battery therewithin, whereby said walls maintain the battery in each compartment in out-of-contact relationship with the batteries in the other compartments, and each compartment being polarized so that a battery can be placed therein only in a predetermined position; means for electrically interconnecting the battery compartments; and means for connecting a user circuit to the battery holder.

2. The battery holder of claim 1 and further comprising means for retaining the batteries within the compartments.

3. The battery holder of claim 2 wherein the means for retaining the batteries comprises a plurality of resilient fingers projecting from a wall to hold each battery in place against movement respective to its compartment.

4. The battery holder of claim 3 wherein the means for retaining the battery further comprises a plurality of projections from the walls of the compartment, forming with the resilient fingers a three point support to hold the battery in place against movement respective to its compartment.

5. The battery holder of claim 2 wherein said drawer having a plurality of polarized compartments and said means for retaining the battery is a one piece molded unit.

6. The battery holder of claim 1 and further comprising means permitting entry of an object into the compartment to dislodge the battery.

7. The battery holder of claim 1 wherein each compartment is polarized by a pair of substantially parallel flanges located on a surface of the end wall facing the predetermined position for the positive battery terminal, with the flanges being separated by a distance at least equal to the diameter of the positive terminal of the battery.

8. The battery holder of claim 1 wherein the means for connecting a user circuit to the battery holder comprises an elongated strip of spring metal, a "U"-shaped bend at one end of the strip for engagement with the edge of a wall, and the other end of the strip being turned inward toward the "U"-shaped bend and adapted to pass through an aperture in the wall and grasp the wall.

9. The battery holder of claim 1 wherein the means for electrically interconnecting the batteries comprises an oval shaped strip of spring metal having one closed end and one open end; the closed end of the strip being "U"-shaped for engagement with the edge of a wall; and the open end of the oval shaped strip forming two arms with the ends of the arms turned inward toward the "U"-shaped end and having complementary cutouts and tabs on the ends of the inturned arms adapted for passing through an aperture in the wall and for grasping the wall.

10. The battery holder of claim 1 and further comprising a pair of flanges projecting from said battery holder, a lamp contact spring positioned within each flange, and a fluorescent lamp contacting the lamp contact springs whereby said lamp is securely attached to said battery holder.

11. The battery holder of claim 10 and further comprising a circuit switch located within one flange electrically connecting said user circuit to said battery holder only when said flourescent lamp is electrically connected to said user circuit.

12. A battery holder comprising a drawer having a plurality of compartments, each compartment being separated from the others by walls and being sized to accommodate a single battery, and each compartment being polarized so that a battery can be placed therein only in a predetermined position; means for electrically interconnecting the battery compartments; means for connecting a user circuit to the battery holder; and means for retaining the batteries within the compartments, said retaining means comprising a plurality of resilient fingers projecting from a wall to hold each battery in place against movement respective to its compartment.

* * * * *